United States Patent Office.

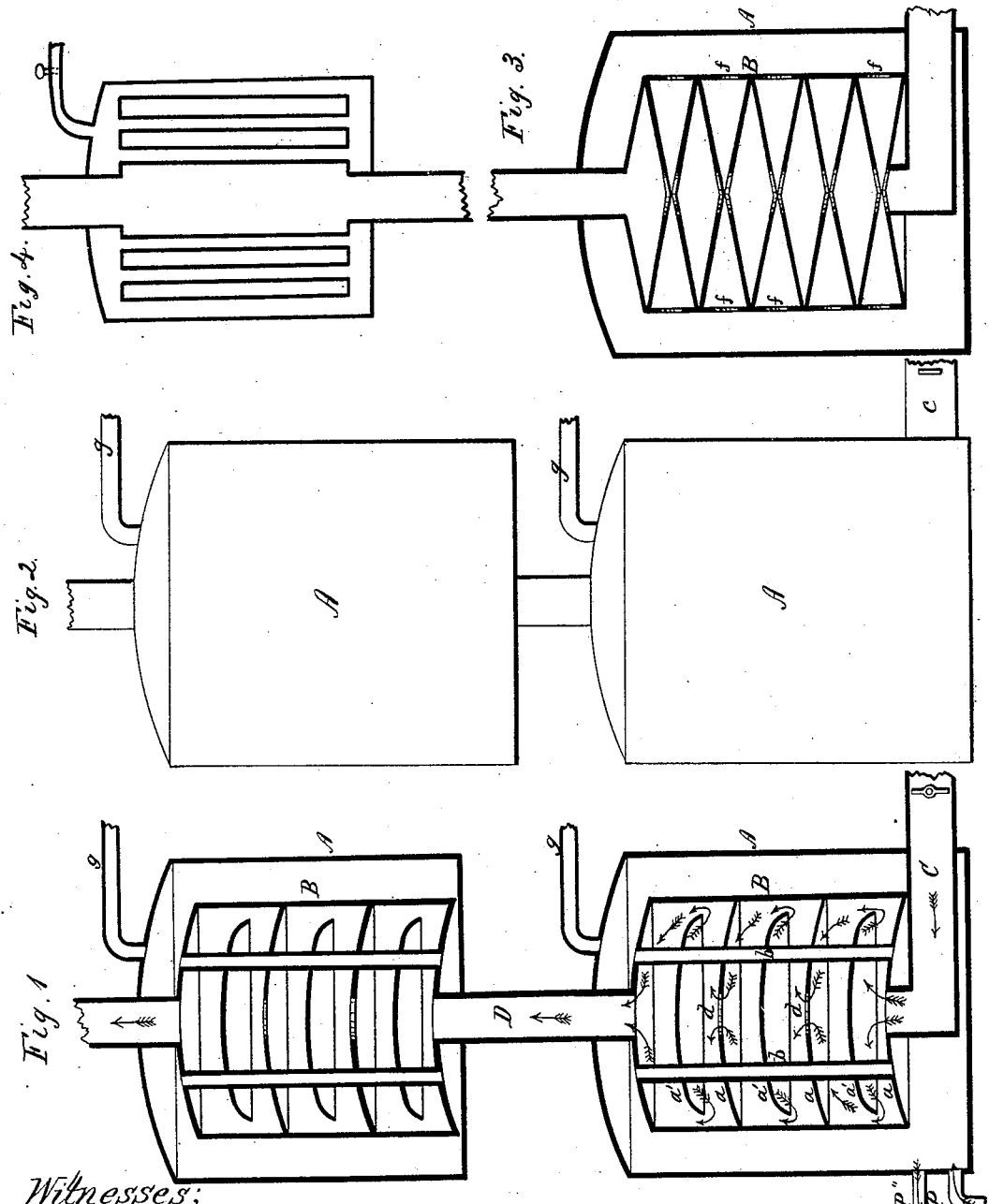

EDWARD DUNSCOMB, OF BOSTON, MASSACHUSETTS.

Letters Patent No. 79,215, dated June 23, 1868; antedated May 7, 1868.

IMPROVEMENT IN STEAM-GENERATORS.

The Schedule referred to in these Letters Patent and making part of the same.

TO ALL TO WHOM THESE PRESENTS SHALL COME:

Be it known that I, EDWARD DUNSCOMB, of Boston, county of Suffolk, Commonwealth of Massachusetts, have invented new and useful Improvements in Steam-Generators; and hereby declare the following to be a full, clear, and exact description thereof, reference being had to the accompanying drawings, making part of this specification.

The object of the invention is to utilize the products of combustion, now lost by escaping into smoke-discharge flue, chimney, or stack.

I accomplish this by using a steam-generating apparatus in connection with or in addition to the boiler now used, substantially as hereinafter described; or when boilers are not used, by conducting into the generator, from the furnace, stove, or fire-pot, the products of combustion before they pass into the flue, chimney, or stack, or other ultimate smoke-discharge.

In the drawings above referred to, A denotes the external cylindrical shell of the apparatus to contain the water to be converted into steam, and which has within it, as shown in Figure 1 of the drawings, a generator composed of the hollow drum B, and a series of annular disks, $a$ $a'$, &c., united by a range of vertical pipes, $b$ $b$, &c., open at top and bottom, to allow free circulation of water through them.

The lower disk $a$, and each alternate disk above it, are confined to inner circumference of shell B, so as to make a tight joint at the point of contact.

The disks $a'$ $a'$ are smaller in circumference than the disks $a$ $a$, so as to leave a space between their outer peripheries and the inner circumference of the shell B, the whole shown in fig. 1 of the drawings.

The larger disks $a$ $a$ have holes or passages, $d$, made in them centrally, for the passage through them of the heated products of combustion.

The drum B has a heat-induction pipe, $c$, at its bottom, to carry in from the furnace, stove, or fire-pot, the heated products of combustion, and an eduction, D, at its top, to carry off same.

The steam-conducting or escape-pipe is shown at $g$, through which steam can be carried into "valve-chest" and valves of an engine, or conducted to any other desired place for utilization.

The apparatus so made is to be situated in a convenient position with respect to the usual boiler, the fireplace of the furnace, or stove, or fire-pot, so as to allow the products of combustion so pass through the pipe $c$, and into the lower disk $a$ of the series, when these highly-heated products of combustion impinge against the lower surface of disk $a$, and pass upward through the opening $d$ into the disk $a'$, and after coursing across its ($a'$) under surface, escape around its ($a'$) outer periphery, and rise into the disk $a$ above it; and in like manner through and around the successive disks, until it escapes through the uppermost disk into eduction-pipe D, and thence into the chimney of the furnace, &c., &c., or into the atmosphere.

Two, or any desirable number of these steam-generators may be placed, one over the other, in order to completely utilize the products of combustion; also serve to heat water, to supply hot feed-water to the lower generator or to the boiler; also to extract dye from dye-wood chips or dye-wood dust, placed in the cylindrical shell A; also for chemical results demanding hot water or steam, and for many other useful purposes.

A modification of my invention is shown in Figure 3 of the drawings, in which the edges of the disks or deflectors are united together, and to the inner circumference of the drum B, having ports or passages $f$ $f$ made through the drum, to allow the circulation of fluid and steam around them.

Figure 4 is a generator, as before described, but not having the interior arrangements of deflectors or disks, composed simply of a hollow drum, B, and vertical pipes $b$ $b$ $b$ $b$, open at top and bottom, to allow free circulation through them of water or other liquid. By this free circulation and consequent agitation is produced quick and rapid vaporization, operated by the pipes $c$ and D, as before described.

*Method of Feeding Water into Shell A of Generator B ; also of Feeding Heated Water into a Steam-Boiler from A.*

Water is fed into cylindrical shell A, as commonly practised to feed water into steam-boilers, through pipe P, feeding water into cylindrical shell A, to be converted into steam by heat from generator B.

P', pipe through which heated water is fed from an upper into a lower cylindrical shell, A, by any method practised to feed water into steam-boilers.

P'', pipe through which heated water is fed from cylindrical shell A into a steam-boiler, by employment of any appropriate method used to feed water into steam-boilers.

By the above description it will be seen that I utilize the products of combustion, which now, by passing into the smoke-discharge flue, are wasted; also I utilize much of the direct heat from the fire, not exhausted by the primary boiler.

*Claim.*

I claim a steam-generator, constructed and arranged as shown and described.

Washington, D. C., October 3, 1866.

EDWARD DUNSCOMB.

Witnesses:
   P. E. WILSON,
   HENRY R. WALTON.